(12) United States Patent
Izzat et al.

(10) Patent No.: US 10,101,746 B2
(45) Date of Patent: Oct. 16, 2018

(54) AUTOMATED VEHICLE ROAD MODEL DEFINITION SYSTEM

(71) Applicant: DELPHI TECHNOLOGIES, INC., Troy, MI (US)

(72) Inventors: Izzat H. Izzat, Oak Park, CA (US); Dimitris Zermas, Minneapolis, MN (US); Uday Pitambare, Mountain View, CA (US)

(73) Assignee: Delphi Technologies, Inc., Troy, MI (US)

( * ) Notice: Subject to any disclaimer, the term of this patent is extended or adjusted under 35 U.S.C. 154(b) by 148 days.

(21) Appl. No.: 15/244,474

(22) Filed: Aug. 23, 2016

(65) Prior Publication Data
US 2018/0059666 A1 Mar. 1, 2018

(51) Int. Cl.
G05D 1/00 (2006.01)
G01C 21/30 (2006.01)
G05D 1/02 (2006.01)
G06K 9/00 (2006.01)

(52) U.S. Cl.
CPC .......... *G05D 1/0212* (2013.01); *G01C 21/30* (2013.01); *G05D 1/0088* (2013.01); *G06K 9/00208* (2013.01); *G06K 9/00791* (2013.01); *G06K 9/00798* (2013.01)

(58) Field of Classification Search
CPC ......... G05D 2201/0213; G05D 1/0219; G05D 1/0212; G05D 1/0088; G08G 1/096725; G08G 1/167; G01C 21/3623; G01C 21/3644; G01C 21/3602; G01C 21/30

USPC ...... 701/23, 300, 301, 302; 342/118, 29, 54, 342/70
See application file for complete search history.

(56) References Cited

U.S. PATENT DOCUMENTS

| | | | |
|---|---|---|---|
| 8,825,260 B1 | 9/2014 | Silver et al. | |
| 2010/0030473 A1* | 2/2010 | Au | G01S 17/936 701/301 |
| 2015/0120244 A1* | 4/2015 | Ma | G01C 15/00 702/172 |
| 2015/0279219 A1 | 10/2015 | Gillet et al. | |

OTHER PUBLICATIONS

Nguyen, et al: "A Comparison of Line Extraction Algorithms Using 2D Laser Rangefinder for Indoor Mobile Robotics", Conference on Intelligent Robots and Systems, IROS 2005, Edmonton, Canada, published 2005 by IEEE/RSJ International Conference on Intelligent Robots and Systems, 6 pages.

* cited by examiner

Primary Examiner — Nga X Nguyen
(74) Attorney, Agent, or Firm — Lawrence D Hazelton

(57) ABSTRACT

A road-model-definition system suitable for an automated-vehicle includes a lidar-unit and a controller. The lidar-unit is suitable to mount on a host-vehicle. The lidar-unit is used to provide a point-cloud descriptive of an area proximate to the host-vehicle. The controller is in communication with the lidar-unit. The controller is configured to: select ground-points from the point-cloud indicative of a travel-surface, tessellate a portion of the area that corresponds to the travel-surface to define a plurality of cells, determine an orientation of each cell based on the ground-points within each cell, define a road-model of the travel-surface based on the orientation of the cells, and operate the host-vehicle in accordance with the road-model.

9 Claims, 8 Drawing Sheets

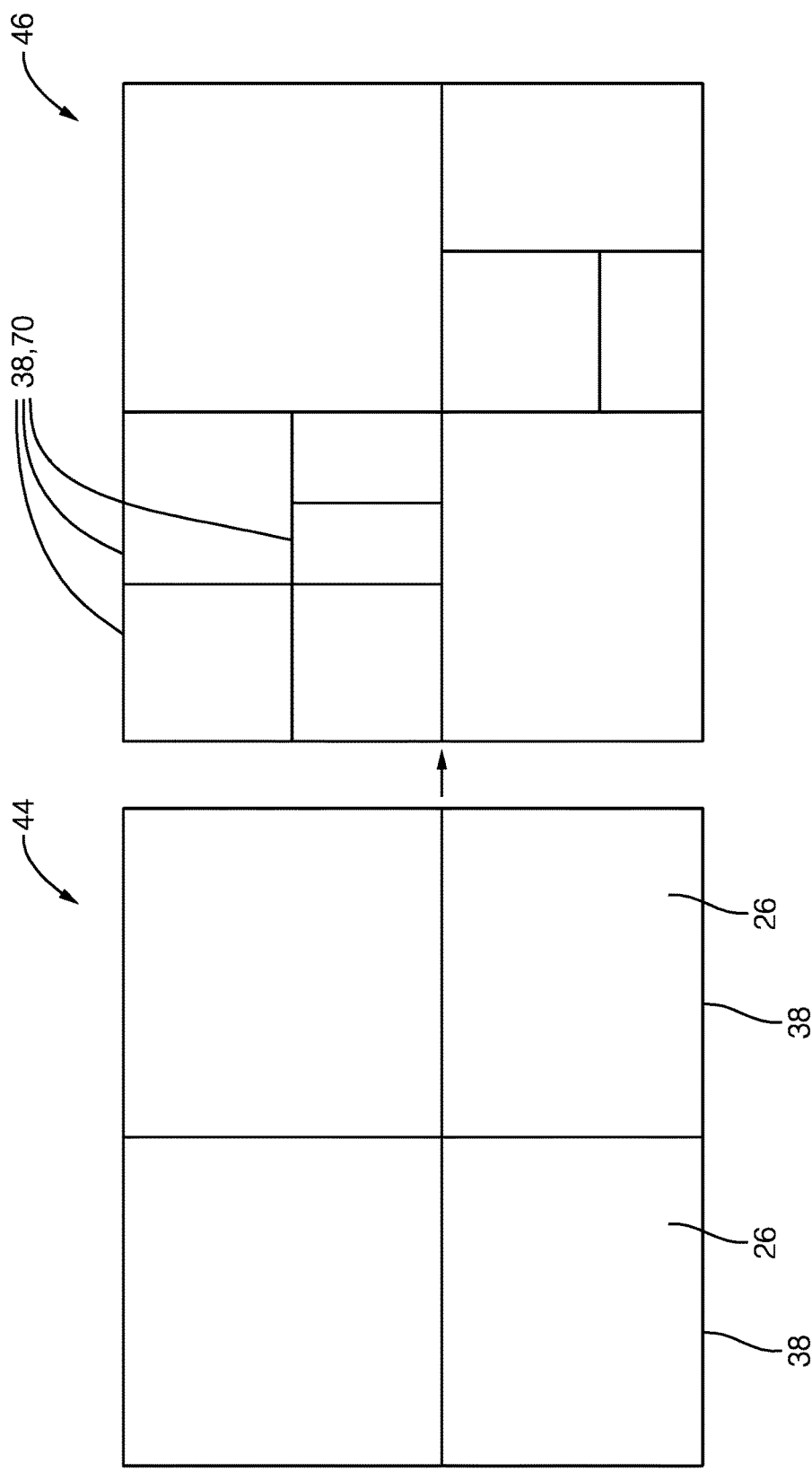

AUTOMATED VEHICLE ROAD MODEL DEFINITION SYSTEM

TECHNICAL FIELD OF INVENTION

This disclosure generally relates to a road-model-definition system, and more particularly relates to a system that tessellates (i.e. applies a grid to) the area that corresponds to a travel-surface to define a plurality of cells, and defines a road-model of the travel-surface based on the orientation of those cells.

BACKGROUND OF INVENTION

An accurate road-model of an upcoming road segment is desirable for automated-vehicles and automotive active safety systems. Road-models that use a single plane to represent a travel-surface (e.g. a roadway) have been suggested. However, using a single plane is not always adequate as the travel-surface is not always planar, so the effects of road angle (crown, changing slopes) on the behavior of a vehicle moving on the travel-surface are not predictable.

SUMMARY OF THE INVENTION

Described herein is a road-model definition system that receives point-cloud data from a Light Detection And Ranging unit (lidar-unit) indicative of an area proximate to a host-vehicle, and processes that data by tessellating the portion of the area that corresponds to a travel-surface (e.g. a roadway) into distinct cells. The system fits two-dimensional (2D) planes to each of the cells so that a three-dimensional (3D) road-model is constructed based on a piece-wise linear model of the travel-surface that is formed by the arrangement of 2D planes, where the extents of the planes are defined by the tessellation used to define the cells. This tessellation and piece-wise planar approximation of the travel-surface reduces the amount of data processing necessary to optimally operate the host-vehicle when compared to road-modeling techniques that, for example, characterize the shape of the travel-lane using complex non-linear techniques.

In accordance with one embodiment, a road-model-definition system suitable for an automated-vehicle is provided. The system includes a lidar-unit and a controller. The lidar-unit is suitable to mount on a host-vehicle. The lidar-unit is used to provide a point-cloud descriptive of an area proximate to the host-vehicle. The controller is in communication with the lidar-unit. The controller is configured to: select ground-points from the point-cloud indicative of a travel-surface, tessellate a portion of the area that corresponds to the travel-surface to define a plurality of cells, determine an orientation of each cell based on the ground-points within each cell, define a road-model of the travel-surface based on the orientation of the cells, and operate the host-vehicle in accordance with the road-model.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which:

FIGS. 4A and 4B illustrate the combining of initial-cells (FIG. 4A) into finalized-cells (FIG. 4B) by the system of FIG. 1 in accordance with one embodiment;

DETAILED DESCRIPTION

Figure 1:
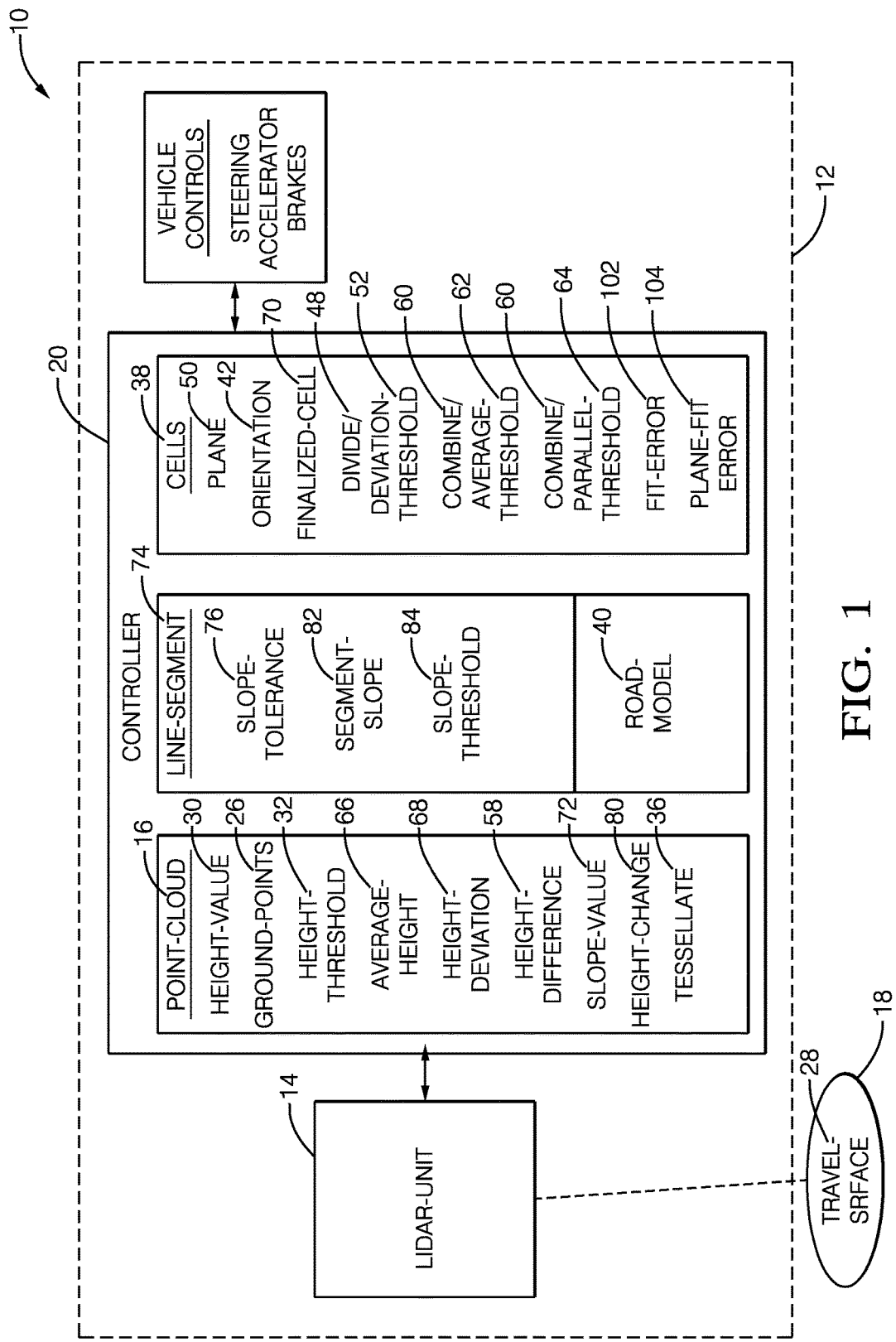
FIG. 1 is a diagram of a road-model definition system in accordance with one embodiment.

FIG. 1 illustrates a non-limiting example of a road-model-definition system 10, hereafter referred to as the system 10, which is suitable for operating an automated-vehicle, a host-vehicle 12 for example. While the examples presented may be characterized as being generally directed to instances when the host-vehicle 12 is being operated in an automated-mode, i.e. a fully autonomous mode, where a human operator (not shown) of the host-vehicle 12 does little more than designate a destination to operate the host-vehicle 12, it is contemplated that the teachings presented herein are useful when the host-vehicle 12 is operated in a manual-mode. While in the manual-mode the degree or level of automation may be little more than providing steering assistance to the human operator who is generally in control of the steering, accelerator, and brakes of the host-vehicle 12. That is, the system 10 may only assist the human operator as needed to maintain control of the host-vehicle 12 and/or avoid interference and/or a collision with, for example, another vehicle.

The system 10 includes, but is not limited to, a lidar-unit 14 suitable to mount on the host-vehicle 12. Being suitable means that the lidar-unit 14 is generally designed and built to survive the rigors of an automotive application due to temperature variation, vibration, and exposure to moisture and various chemicals that would be expected for such an application. The lidar-unit 14 is used by the system 10 to provide a point-cloud 16 (also see FIGS. 2 and 3) descriptive of (i.e. indicative of or corresponding to) an area 18 proximate to the host-vehicle 12. The lidar-unit 14 may be mounted atop the host-vehicle 12 so that a full 360° field-of-view can be observed by a single instance of the lidar-unit 14, as suggested by FIG. 2. Alternatively, the lidar-unit 14 may be configured and/or mounted to the host-vehicle in a manner such that the lidar-unit 14 has a field-of-view limited to an area forward of the host-vehicle 12, or the lidar-unit 14 may correspond to a plurality of lidar-units mounted at multiple locations about the host-vehicle 12.

The system 10 includes a controller 20 in communication with the lidar-unit 14. The controller 20 may include a processor (not specifically shown) such as a microprocessor and/or other control circuitry such as analog and/or digital control circuitry including an application specific integrated circuit (ASIC) for processing data as should be evident to those in the art. The controller 20 may include memory (not specifically shown), including non-volatile memory, such as electrically erasable programmable read-only memory (EEPROM) for storing one or more routines, thresholds, and captured data. The one or more routines may be executed by the processor to perform steps for determining a road-model 40 of the area 18 about the host-vehicle 12 based on signals received by the controller 20 from the lidar-unit 14, as described herein.

Figure 2:
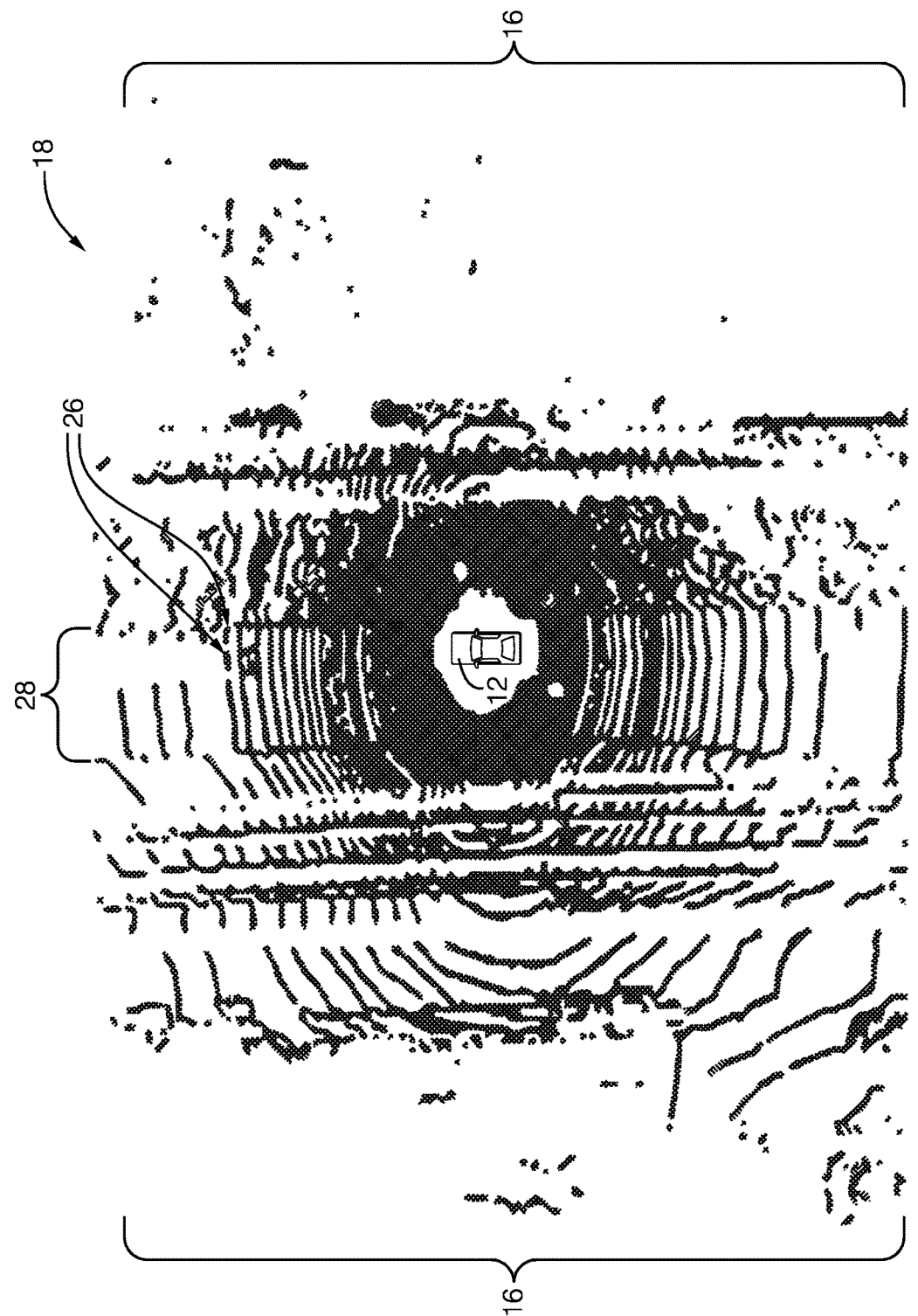
FIG. 2 is a top-view of a point-cloud of an area about a host-vehicle detected by a lidar-unit on the host-vehicle equipped with the system of FIG. 1 in accordance with one embodiment.
Figure 3:
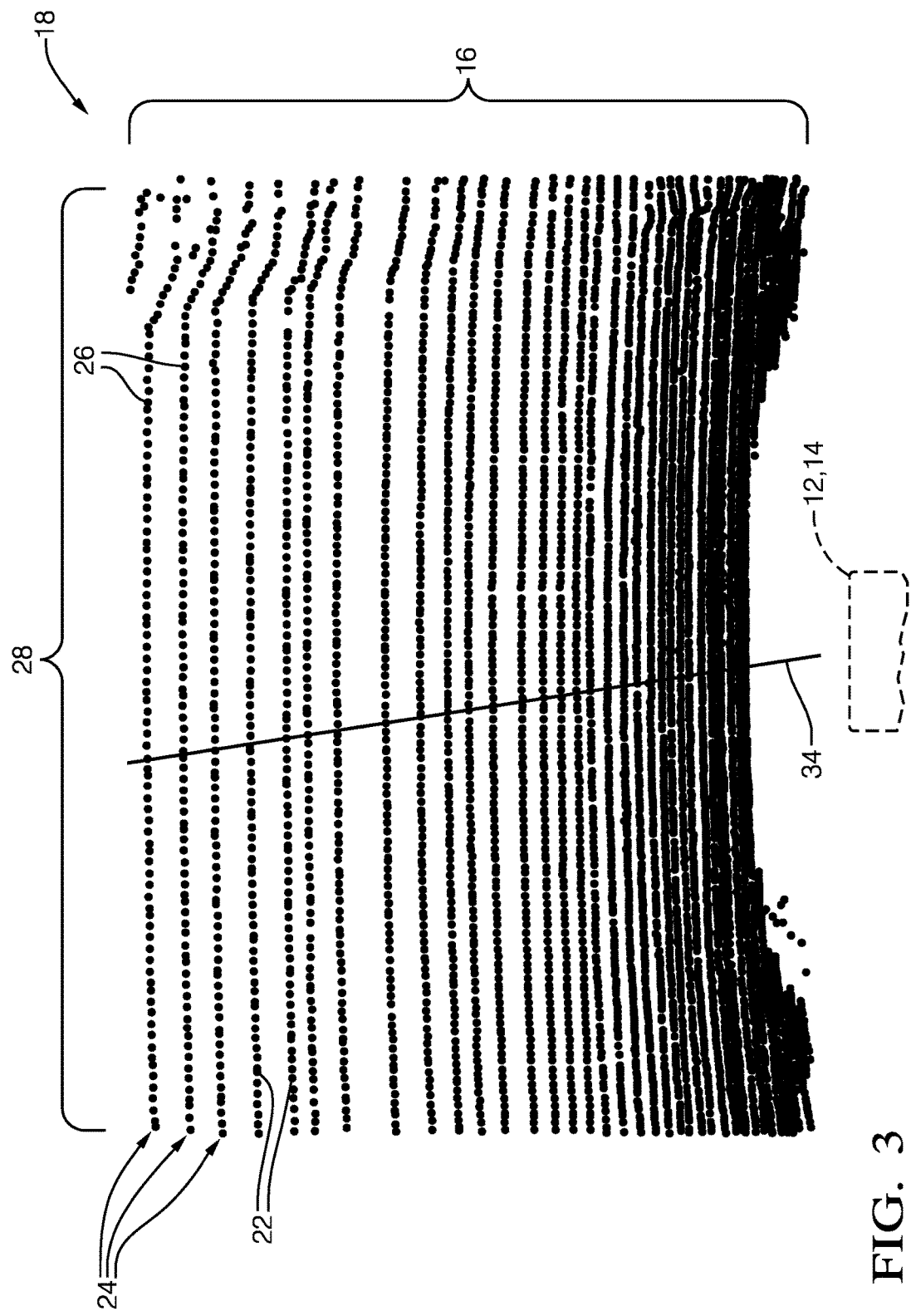
FIG. 3 is close-up of a portion of the point-cloud of FIG. 2 in accordance with one embodiment.

FIGS. 2 and 3 illustrate a non-limiting example of a point-cloud 16 detected or indicated by the lidar-unit 14. FIG. 3 is a close-up or zoomed-in or magnified view of a portion of the point-cloud 16 shown in FIG. 2. The portion of the point-cloud 16 shown in FIG. 3 is located close to and forward of the host-vehicle 12. The host-vehicle 12 and the lidar-unit 14 are not shown in FIG. 3, but are understood to be located off the bottom of the page showing FIG. 3. The point-cloud 16 is formed of many instances of cloud-points 22 that are organized or arranged into, or along, scan-lines 24, as will be recognized by those familiar with the operation of lidar-units.

Continuing to refer to FIGS. 1-3, the controller 20 is configured to select ground-points 26 from the point-cloud 16 that are indicative of or correspond to a travel-surface 28, i.e. a roadway or travel-lane suitable for the host-vehicle 12 to drive upon. That is, the controller 20 selects or determines from the point-cloud 16 which points are part of, or correspond to, the travel-surface 28, e.g. are part of a roadway. The controller 20 may also select or determine which points are not part of the travel-surface, e.g. correspond to a curb or other object preferably avoided by the host-vehicle 12. Each of the cloud-points 22 may include a height-value 30 measured relative to or offset from the expected or intended height of the lidar-unit 14 above a reference-plane established by, for example, calibration of the lidar-unit 14 and/or the controller 20. However, it is recognized that the travel-surface 28 may be curved due to road-crown and/or a variable uphill or downhill slope change, so more sophisticated techniques may be beneficial, techniques such as line-fit, variable-threshold, or seeded plane-fit, which will be explained in more detail below.

FIG. 3 also illustrates a single instance of a radial-line 34 that corresponds to a ray originating at the lidar-unit 14 and extending away to infinity, or at least to the farthest instance of a cloud-point 22 of the point-cloud 16. In the description that follows, references to cloud-points 'on' the radial-line 34 can be interpreted as a reference to those of the cloud-points 22 that are associated with a particular instance of the scan-lines 24 and are closest to the radial-line 34. That is, recognizing that the point-cloud 16 is organized into a plurality of circumferential instances of the scan-lines 24 having a variable (e.g. increasing) radius centered about the lidar-unit 14, instances of the cloud-points 22 that are associated with a particular instance of the radial-line 34 are the cloud-points 22 that are the closest to the radial-line 34 from each of the scan-lines 24. By way of example and not limitation, an available example of the lidar-unit 14 may provide 360° coverage with a half degree (0.5°) resolution and thereby provide for 720 instances of the radial-line 34, e.g. a radial-line every 0.5°. If faster processing is desired, acceptable performance has been observed with the lidar-unit 14 configured to operate with 360 instances of the radial-line 34, i.e. one degree (1°) resolution. On the other hand if more resolution is needed the lidar-unit 14 can be configured to operate with 4000 instances of the radial-line 34, i.e. 0.09° resolution.

As suggested above, one way of selecting which of the cloud-points 22 are ground-points 26 can be done by comparing the height-value 30 of a cloud-point 22 to a height-threshold 32. For example, if the height-value 30 is less than the height-threshold 32, i.e. the cloud-point in question has a relatively small value of the height-value 30, and then the cloud-point in question may be classified as a ground-point 26. However this simple approach may incorrectly classify some cloud-points as ground-points when the road is curving up or down. This presumes that the expected offset distance of the lidar-unit 14 above the aforementioned reference-plane is applied to the actual or raw height-value measured by the lidar-unit 14.

An alternative is a line-fit approach that fits multiple lines with the origin located at the lidar-unit 14 and includes those instances of the cloud-points 22 associated with each instance of the radial-line 34. The line-fit technique is determined based on the height-value 30 of each instance of the cloud-points 22. Line-model-parameters, e.g. line-slope and line-intercept, arising from the line-fit technique can be estimated by several methods such as those described in "A Comparison of Line Extraction Algorithms Using 2D Laser Range Finder for Indoor Mobile Robotics" by V. Nguyen, published August, 2005 in Intelligent Robots and Systems. Once the line-model-parameters are estimated, each of the cloud-points 22 is classified as an instance of the ground-points 26 or a non-ground instance based on a line-slope, line-intercept, and fit error. Also, each instance of the ground-points 26 may be assigned a confidence-value for use by a plane-fit algorithm described later. The confidence-value (between 0 and 1) is defined based on how closely a particular instance of the cloud-points 22 fits a particular instance of the radial-line 34. For example, if an instance of the cloud-points 22 is exactly on the radial-line 34, that cloud-point would be assigned a high confidence-value of 1. Instances of the cloud-points 22 that are spaced apart from the radial-line 34 are assigned a lower confidence-value based on how far they are from the radial-line 34.

The radial-line 34 can be fit using 3D line-fit techniques since the cloud-points 22 are 3D points. However fitting 3D line can be complex and time consuming. In order to speed up the processing, the 3D coordinates may be converted to 2D coordinates using (sqrt(x*x+y*y), z). This results in much faster line-fit processing compared to 3D processing.

In another alternative embodiment, the radial-line 34 can be defined using a polar or Cartesian grid. In this approach the point-cloud 16 is first divided into a grid. For each column a radial line 34 is defined. As an example using polar grid is described, in "Fast segmentation of 3D Point Clouds for ground Vehicles", by M. Himmelsbach, published in 2010 IEEE Intelligent Vehicles Symposium. The creation of grid can be time consuming. Therefore in the preferred embodiment, the radial-line 34 is defined directly from the scan-lines 24.

As noted before, the point-cloud 16 is organized into a circumferentially arranged plurality of scan-lines 24 of increasing radius centered on the lidar-unit 14, see FIG. 2. An alternative way to determine which instances of the cloud-points 22 in the point-cloud 16 are the ground-points 26 that are associated with the travel-surface 28 is now described. The controller 20 may be configured to determine a slope-value 72 of a selected-cloud-point characterized as associated with a selected-scan-line and closest to a radial-line 34 extending radially from the lidar-unit 14. The slope-value 72 is determined based on a height-change 80 (i.e. a change in height) relative to a subsequent-cloud-point characterized as closest to the radial-line 34 and associated with a subsequent-scan-line adjacent to the selected-scan-line. That is, while each instance of the slope-value 72 is associated with a particular cloud-point 22, the slope-value 72 is determined based on the relative locations of at least two instances of the ground-points 26. The controller 20 then defines a line-segment 74 indicative of a consecutive-group of cloud-points 22 characterized as closest to the radial-line 34 for each of the scan-line 24, and characterized by slope-values 72 that are equal to each other within a slope-tolerance 76.

Figure 6:
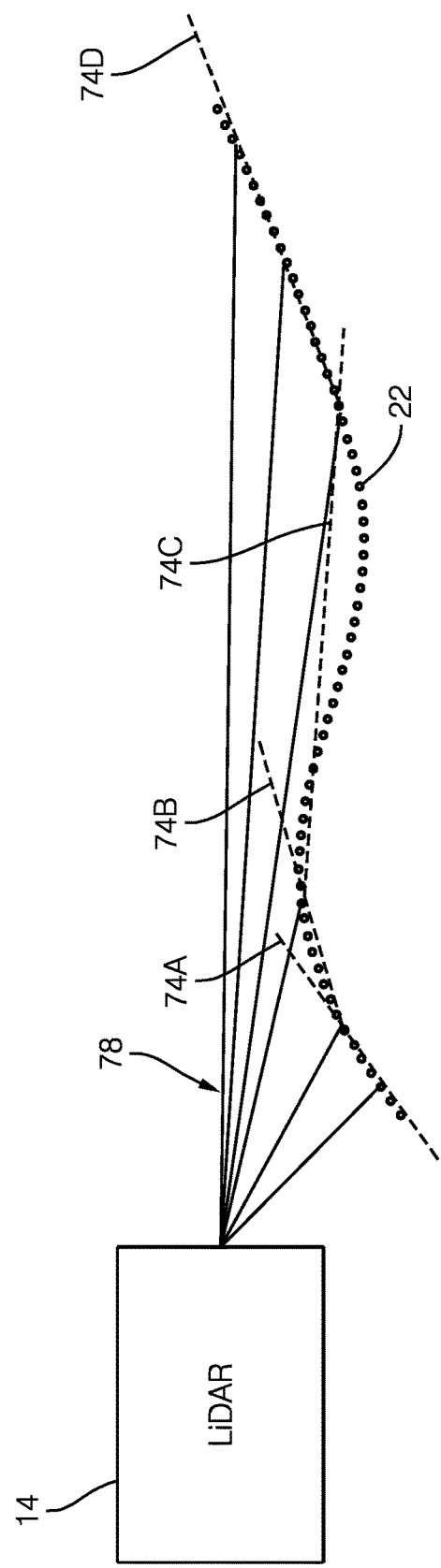
FIG. 6 is a side-view of a portion of data from FIGS. 2 and 3 in accordance with one embodiment.

FIG. 6 illustrates a non-limiting example a side-view (vs. the top-view shown in FIGS. 2-3) of cloud-points 22 associated with a single instance of a radial line 34 such as that shown in FIG. 3. It should be understood that the number of the cloud-points 22 represented by the dotted line corresponds to the number of the scan-lines 24 used to generate the point-cloud 16. In this example the cloud-points 22 are grouped into four instances of a line-segment 74, e.g. 74A, 74B, 74C, and 74D. The cloud-points 22 are grouped this way because the slope-values 72 (FIG. 1) for each of the cloud-points 22 in each group are equal within the slope-tolerance 76. The plurality of rays 78 is shown only to illustrate a few of the laser-beams emitted by the lidar-unit 14 to detect the cloud-points 22

Each instance of the line-segment 74 (e.g. e.g. 74A, 74B, 74C, 74D) may be characterized by a segment-slope 82, and instances of the cloud-points 22 represented by a particular instance of the line-segment 74 are classified as ground-points 26 when the segment-slope 82 of the particular instance of the line-segment 74 is less than a slope-threshold 84. Similarly, instances of the cloud-points 22 may be classified as object-points (i.e. non-ground-points) when the segment-slope is not less than the slope-threshold 84. Other line-fit parameters such as intercept and fit error can also be used to classify instances of the cloud-points 22 in the point-cloud 16.

Once each instance of the cloud-points 22 is classified as a ground-point 26 or non-ground as described above, a plane 50 can be fitted to the data to complete the estimation of the road-model 40. However, in most cases the travel-surface 28 cannot be accurately fitted with a single plane due to variation in the shape of the travel-surface 28, noisy range measurements, or the presence of multiple surfaces in close proximity to each other. It was discovered that tessellation of the travel-surface 28 improves vehicle control performance without excessive processing burden on the controller 20. Tessellation can be done based on regular tessellation into rectangular or other geometric shapes, or based on regions fit error, or on height variation, or connected components. A combination of these approaches is also contemplated. It should be noted in this non-limiting example that only the travel-surface 28 which is determined by the cloud-points 22 that are determined to be the ground-points 26 is considered, and any non-ground points are excluded from the plane-fit. However, it is recognized that tessellation could be applied to those portion of the area 18 that are not part of the travel-surface 28 if a 3D model of those other portions is desired.

Accordingly, the controller 20 is configured to tessellate 36 a portion of the area 18 that corresponds to the travel-surface 28 to define a plurality of cells 38. That is, the ground-points 26 are organized or divided into cells 38 that designated by conceptually overlying the travel-surface with a grid of squares for example. Having the initial tessellation use squares or rectangles makes it easier to combine or divide the initial cells, the reason for which will be explained below.

The controller 20 then determines an orientation 42 of each instance of the cells 38 (e.g. slope or direction of a vector normal to the cell) based on the ground-points 26 within each instance of the cells 38. That is, the controller 20 characterized each cell 38 with an angle relative to level or a vector normal to the plane 50 of the cell 38. The controller then defines a road-model 40 of the travel-surface 28 based on the orientation 42 of each instance of the cells 38, and operates the host-vehicle 12 in accordance with the road-model 40. By way of example, to operate in accordance with the road-model 40 means that the controller 20 considers a bank-angle of an upcoming curve to determine how much the steering-wheels (not shown, typically the front-wheels) of the must be angled to navigate the curve. As will be recognized by those in the art, less steering-angle is need to navigate a curve when the travel-surface 28 is banked toward the inside of the curve (i.e. the inside of the curve is lower than the outside of the curve) when compared to the steering-angle needed to navigate a curve of the same radius when the travel-surface 28 is level.

FIG. 4A shows a non-limiting example of part of an initial-tessellation 44 that may be used to group the ground points 26 (not specifically shown in FIGS. 4A-5B) into the cells 38 defined by the initial-tessellation 44. By way of example and not limitation, if the travel-surface 28 is a two-lane road, the initial-tessellation 44 may have a cell-size of four-meters by four meters (4 m×4 m) so a two-lane road with an eight meter (8 m) total width of the travel-surface 28. It should be understood that it is expected that the initial-tessellation 44 applied to a typical straight two-lane road would have more than four cells, and would have many more cells extending above and below the page on which FIG. 4A is shown to cover the travel-surface 28 close to and distant from the host-vehicle 12. The size of the cells 38 of the initial-tessellation 44 may be selected based on, for example, the average size of the cells 38 in a final-tessellation 46 (FIG. 4B) from immediately prior instances of the road-model 40 for the travel-surface 28. The steps performed by the controller 20 to determine the final-tessellation 46 from the initial-tessellation 44 will be described in more detail below.

FIG. 4B illustrates a non-limiting example of how the initial-tessellation 44 shown in FIG. 4A could be divided to provide a more accurate incarnation of the road-model 40. In this approach, the ground-points 26 are divided into smaller instances of cells 38 as either rectangles or square. The division process may be iterative and stop after few iterations. To perform this division process, the controller 20 is further configured to divide 48 a cell 38 when a deviation from a plane 50 of the cell 38 by ground-points 26 within the cell 38 is greater than a deviation-threshold 52. By way of example and not limitation, the deviation may be characterized as greater than the deviation-threshold 52 when a height-difference 58 to the plane 50 from any instances of the ground-points 26 is greater than the deviation-threshold 52. Alternatively, instead of using only height measured along the z-axis to determine the deviation, the deviation may be the actual distance which would include any errors or differences along the x-axis and the y-axis. In yet another alternative, the controller 20 can divide 48 a cell 38 by computing measures from height within the cell such as maximum absolute difference of height-values 30 or based on the intensity of a laser return if available.

Figure 5B:
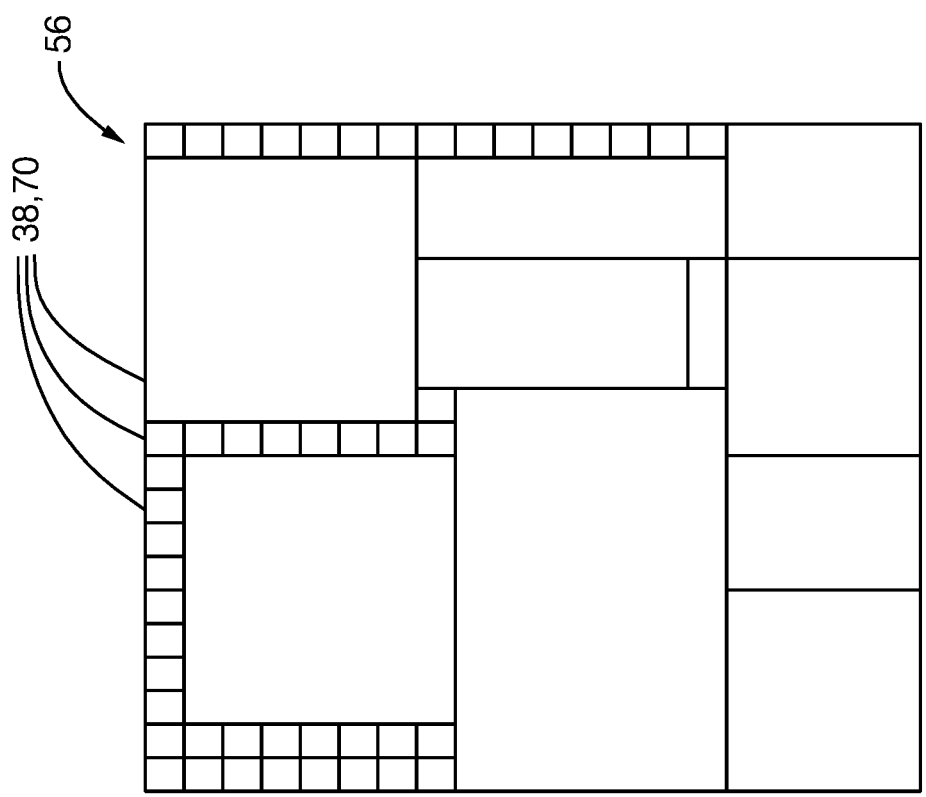
FIGS. 5A and 5B illustrate the dividing of initial-cells (FIG. 4A) into finalized-cells (FIG. 4B) by the system of FIG. 1 in accordance with one embodiment.
Figure 5A:
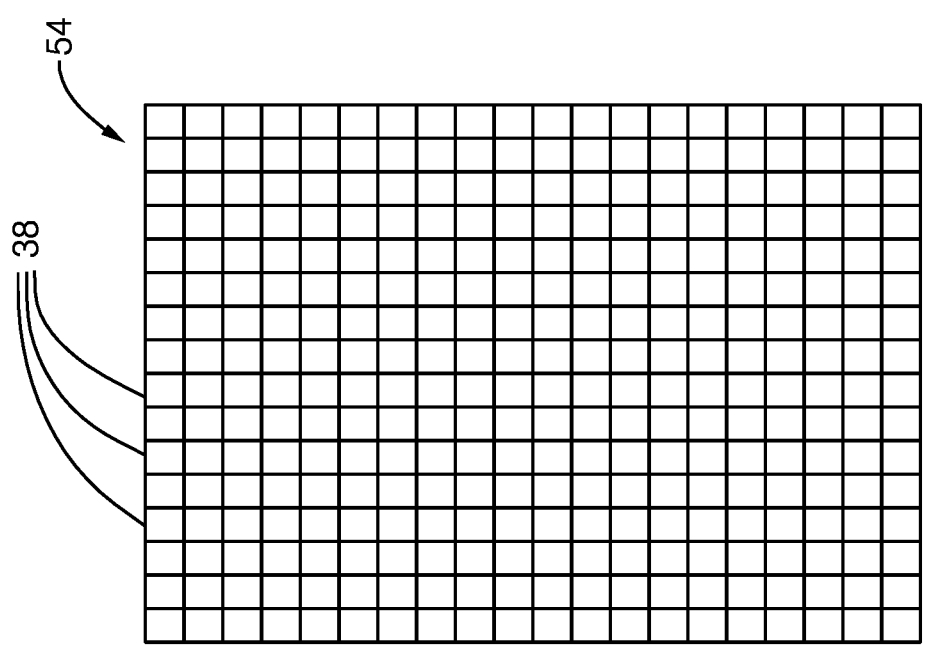

FIG. 5A illustrates another example of an initial-tessellation 54 where the cells 38 appear relatively smaller than what is suggested in FIG. 4A. If applied to a two-lane road as suggested above with regard to FIG. 4A, each of the cells

38 may be a half meter by a half meter (0.5 m×0.5 m). As noted above, it should be understood that the actual tessellation applied to the travel-surface 28 may extend above and below what is shown in FIG. 5A. The size of each cell 38 in the initial-tessellation 54 may be smaller than necessary to determine a road-model 40 with sufficient accuracy, so it may be beneficial to combine some of the cells 38 in the initial-tessellation 54 to reduce the complexity of the road-model 40.

FIG. 5B illustrates a non-limiting example of a final-tessellation 56 that arises from combining instances of the cells 38 from FIG. 5A that have, for example, orientations 42 that are substantially equal. To perform this combining process, the controller 20 may be configured to combine 60 adjacent (i.e. next to each other) instances of the cells when the average-height 66 of the ground-points 26 of the adjacent cells differ by less than an average-threshold 62. For example, if the average-height 66 of the ground-points 26 in one instance of the cells 38 is within one-hundred millimeters (100 mm) of the average-height 66 of the ground-points 26 in an adjacent instance of the cells 38, those cells may be combined to form a larger cell.

Alternatively, the controller 20 may be configured to combine 60 adjacent instances of the cells 38 when the planes 50 of the adjacent cells are parallel within a parallel-threshold 64. For example, if the planes 50 associated with adjacent instances of the cells 38 are within one degree of angle (1° angle), the adjacent instances of the cells 38 may be combined into a larger instance of a cell without substantively degrading the accuracy of the road-model 40. As another alternative, normal-vectors normal to the planes of each of the cells 38 may be calculated or estimated, and if the normal-vectors of adjacent planes are parallel within the parallel-threshold, the adjacent cells may be combined. As before, the process may be iterative, i.e. the controller 20 may be configured to repeat combine step if necessary.

The steps of divide 48 and/or combine 60 may be repeated iteratively until all of the cells 38 in the final-tessellation (46, 56) meet the various threshold criteria. Accordingly, the controller 20 may be configured to designate a cell 38 as a finalized-cell 70 when a height-deviation 68 from the plane 50 of the cell 38 by the ground-points 26 within the cell 38 is not greater than the deviation-threshold 52, and the cell 38 is not parallel to any adjacent cell within the parallel-threshold 64. The controller 20 then defines the road-model 40 of the travel-surface 28 based on the orientation 42 of finalized-cells 70 when all cells are characterized as finalized-cells 70.

One way to determine the orientation 42 of the plane 50 of a particular instance of a cell 38 is to fit a plane 50 to all of the ground-points 26 using, for example, a least-squared-error method, as will be recognized by those in the art. Alternatively, the computational burden on the controller 20 may be reduced if the orientation is determined iteratively for each of the finalized-cells 70 using fit-seeds selected from the ground-points within the finalized-cell 70 that are characterized by a height-value less than a height-threshold 32. In other words, the orientation 42 of a cell 38 may be determined based on a plane 50 defined by those instances of the ground-points 26 of the cell 38 that are characterized by a height-value less than a height-threshold. Alternatively, the orientation 42 of a cell 38 may be determined using those instances of the ground-points 26 of the cell 38 that are characterized by as within a deviation-threshold of an estimated-plane. The confidence-value defined from the line-fit can be used to help select fit-seeds since they represent high quality ground-points.

Figure 7:
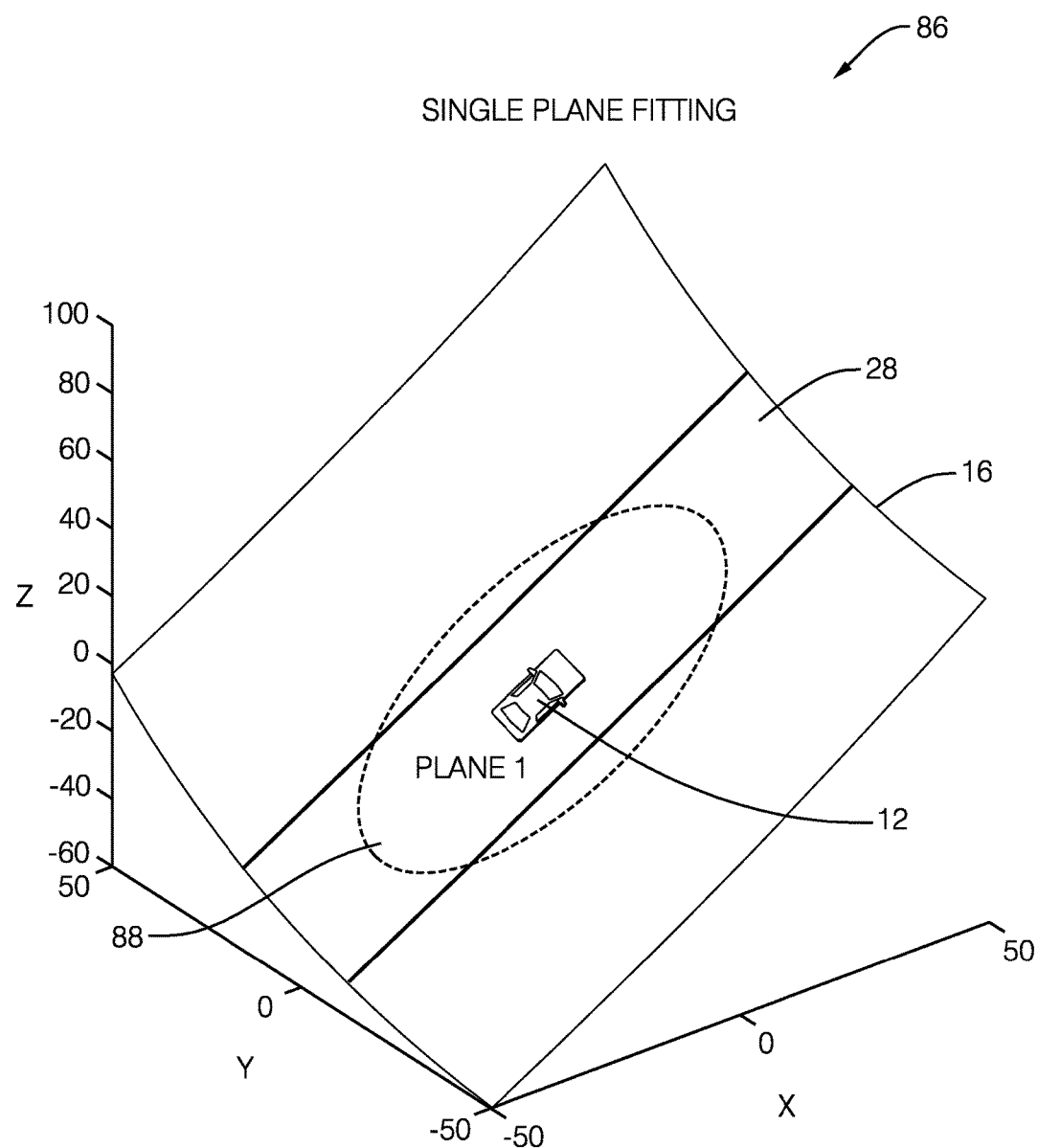
FIG. 7 is a graphical representation of point-cloud data proximate to a vehicle equipped with the system of FIG. 1 in accordance with one embodiment.

FIG. 7 illustrates a graph 86 that is another non-limiting example of a point-cloud 16 generated by a lidar-unit 14, where an alternative methodology to optimize the selection of points that belong to the travel-surface 28 is proposed. The method uses a plane-fit approach to select the ground-points 26 from the point-cloud 16 that are indicative of the travel-surface 28 using a deterministic plane-fit. Operating under the assumption that points of the point-cloud 16 adjacent to the front of the host-vehicle 12 are most likely to belong to the travel-surface 28, it is possible to alleviate the randomness of the initialization step as seen in typical plane-fit techniques such as the RANdom SAmple Consensus (RANSAC). This prior knowledge is used to dictate a deterministic set of points for the initiation of the algorithm, resulting in much faster convergence. Initially, a set of points at the proximal surrounding area of the host-vehicle 12 and below a height-threshold 32 are selected and used to estimate the plane they define. Next, a fit-error 102 (FIG. 1) of all the points in the point-cloud 16 are evaluated, and those that are close to the plane 88 within a plane-fit-threshold 104 are included in the plane 88. Using all the points within the plane-fit-threshold 104, a new instance of a plane 50 is estimated again and evaluated over the rest of the cloud-points 22 in the point-cloud 16. This step is repeated for a user-defined number of iterations and the final iteration of the plane 88 is treated as the travel-surface 28. The experiments show that three to four iterations are enough to robustly select the plane 88 that best describes the ground, i.e. the travel-surface 28.

The fit-error 102 to a plane is well known in the art and is defined as the distance of a point in the point-cloud 16 from its orthogonal projection on the candidate instance of the plane 88. This distance is used to judge whether the point is considered to belong in the plane 88 or not, and provides a measure of how good the plane-fit is. All points within the fit-error 102 that are less than a plane-fit-threshold 104 (e.g. 0.15 cm) are considered part of the plane and hence classified as part of the travel-surface 28.

Figure 8:
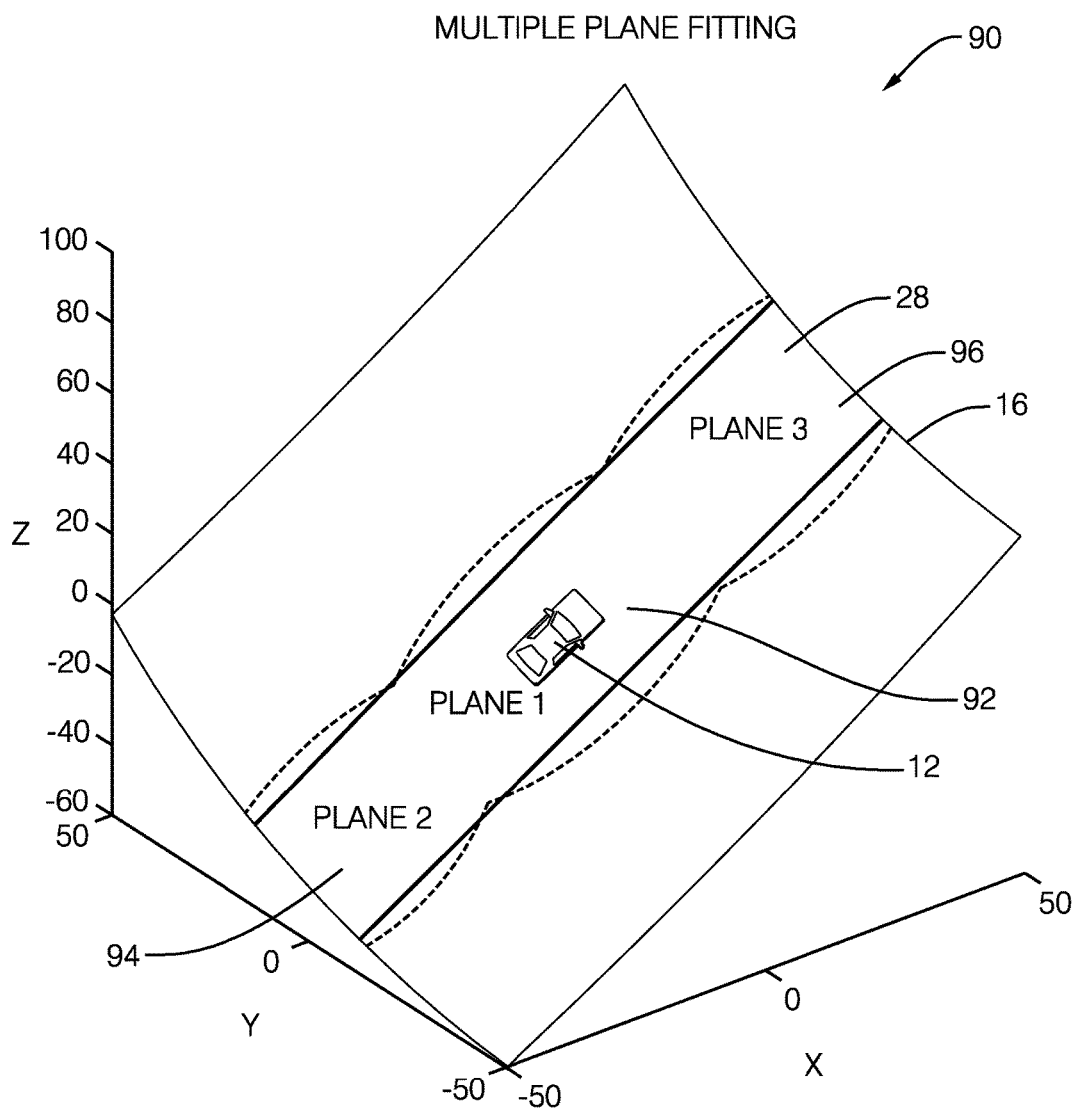
FIG. 8 is a graphical representation of point-cloud data proximate to a vehicle equipped with the system of FIG. 1 in accordance with one embodiment.

FIG. 8 illustrates a graph 90 of another non-limiting example of a point-cloud 16. There are two conditions that make a single-plane, deterministically seeded plane-fit model insufficient for a real world deployment; (i) the lidar-unit 14 introduces noise for measurements far away, and (ii) the ground-points 26 do not form a perfect plane. It has been observed that most instances of the travel-surface 28 exhibit changes in slope-value 72 which need to be detected. An instantiation of the aforementioned deterministically seeded plane-fit technique that extends its applicability to a non-flat instance of the travel-surface 28 involves the division of the point-cloud 16 into segments along the x-axis (direction of travel of the host-vehicle 12), and the application of the deterministically seeded plane-fit in each one of those segments. As depicted in FIG. 8, the selection of the seed points for a first plane 92 is performed as described previously with points in the proximity of the host-vehicle 12. The seed points for a second plane 94 and a third plane 96 are selected based on their height value. In particular, the points in each segment that corresponds to a plane (e.g. 92, 94, 96) are sorted based on their height value and a user-defined number of those with the lowest height values are selected. Then, the average of these low height valued points is computed. Finally, points from the whole segment within a threshold to that average are treated as seed points for that segment. Each of the segments has such a set of seed points which are used to estimate the plane they define. Similar to the single plane approach, for each of the estimated planes the fit-error 102 of all the points in the respective segment are evaluated, and those that are close to the plane within a plane-fit-threshold are included in the plane. Experiments indicate that processes that use three segments of a predefined size are typically sufficient to capture changes in the curvature and slope-value 72 of the travel-surface 28, and those processes manage to extract the travel-surface 28 from the rest of the point cloud 16 in a relatively short execution time.

In another embodiment of the multiple plane-fit techniques, the seed points for the first plane 92 are selected the same way as the rest of the plane segments that is based on the height values of the lowest points in its respective point-cloud 16 segment. The same plane-fit approach can be used to fit tessellated regions for the bottom-up (combine 60) or top-down (divide 48) tessellation method described above. The seeds in this case can be selected from each cell to evenly distribute the points used to estimate the plane. The confidence-value defined from the line-fit can be used to select good seed points, for example, by rejecting seed points that are characterized as low confidence ground-points.

Accordingly, a road-model-definition system (the system 10), a controller 20 for the system 10, and a method of operating the system 10 is provided. By tessellating the ground-points 26, the road-model 40 can be a planar piecewise approximation of the travel-surface 28, and thereby reduce the computational complexity of the road-model 40

While this invention has been described in terms of the preferred embodiments thereof, it is not intended to be so limited, but rather only to the extent set forth in the claims that follow.

We claim:

1. A road-model-definition system suitable for an automated-vehicle, said system comprising:
a lidar-unit suitable to mount on a host-vehicle, said lidar-unit used to provide a point-cloud descriptive of an area proximate to the host-vehicle; and
a controller in communication with the lidar-unit, said controller configured to
select ground-points from the point-cloud indicative of a travel-surface,
tessellate a portion of the area that corresponds to the travel-surface to define a plurality of cells,
determine an orientation of each cell based on the ground-points within each cell,
divide a cell when a height-deviation from a plane of the cell by the ground-points within the cell is greater than a deviation-threshold,
combine adjacent cells when planes of the adjacent cells are parallel within a parallel-threshold,
designate a cell as a finalized-cell when the deviation from the plane of the cell by the ground-points within the cell is not greater than the deviation-threshold and the cell is not parallel to any adjacent cell within the parallel-threshold,
define the road-model of the travel-surface based on the orientation of finalized-cells when all cells are characterized as finalized-cells, and
operate the host-vehicle in accordance with the road-model.

2. The system in accordance with claim 1, wherein the deviation is greater than the deviation-threshold when a height-difference to the plane from any ground-point is greater than the deviation-threshold.

3. The system in accordance to claim 1, wherein the orientation is determined iteratively for each of the finalized-cells using fit-seeds selected from cloud-points within the finalized-cell characterized by a height-value less than a height-threshold.

4. The system in accordance with claim 1, wherein the point-cloud is organized into a plurality of circumferential scan-lines of increasing radius centered around the lidar-unit, and the controller is further configured to determine a slope-value of a selected-cloud-point characterized as closest to a radial-line extending radially from the lidar-unit and associated with a selected-scan-line, said slope-value determined based on a height-change relative to a subsequent-cloud-point characterized as closest to the radial-line and associated with a subsequent-scan-line adjacent to the selected-scan-line, and define a line-segment indicative of a consecutive-group of cloud-points characterized as closest to the radial-line and characterized by slope-values that are equal within a slope-tolerance.

5. The system in accordance with claim 4, wherein the line-segment is characterized by a segment-slope, and the cloud-points represented by the line-segment are classified as ground-points when the segment-slope is less than a slope-threshold.

6. The system in accordance with claim 1, wherein the orientation of a cell is determined based on a plane defined by ground-points of the cell characterized by a height-value less than a height-threshold.

7. The system in accordance with claim 1, wherein the orientation of a cell is determined using ground-points characterized as within a deviation-threshold of an estimated-plane.

8. The system is accordance to claim 1, wherein the ground-points are determined using an iterative deterministic plane-fit using plane-fit-seeds from the point-cloud that were selected from a forward-portion located forward of the host-vehicle, and a cloud-point is classified as a ground-point when a fit-error is less than a plane-fit-threshold.

9. The system is accordance to claim 1, wherein the ground-points are determined by dividing the points-cloud into a plurality of regions, a first plane is determined iteratively using a deterministic plane-fit on plane-fit-seeds from the point-cloud that were selected from an area located forward of the host-vehicle, a second plane is determined using an iterative deterministic plane-fit on plane-fit-seeds from the point-cloud that were selected from low height cloud-points in the first plane and the second plane, and a cloud-point is classified as a ground-point when a fit-error is less than a plane-fit-threshold.

* * * * *